United States Patent [19]

Keenan

[11] Patent Number: 5,323,682
[45] Date of Patent: Jun. 28, 1994

[54] METHOD FOR PROTECTING A SPACE VEHICLE AND RESULTANT VEHICLE

[75] Inventor: Vincent J. Keenan, Paoli, Pa.

[73] Assignee: The United States of America as represented by the Secretary of the Navy, Washington, D.C.

[21] Appl. No.: 336,442

[22] Filed: Mar. 9, 1989

[51] Int. Cl.⁵ .............................. F41F 5/00; B05B 5/00
[52] U.S. Cl. ..................................... 89/1.11; 427/160; 428/256
[58] Field of Search .................... 428/256; 89/1.11; 427/160

[56] References Cited

U.S. PATENT DOCUMENTS

| | | | |
|---|---|---|---|
| 4,147,938 | 4/1979 | Heckman et al. | 250/506.1 |
| 4,254,177 | 3/1981 | Fulmer | 428/256 |
| 4,349,494 | 9/1982 | Fulmer | 264/45.3 |
| 4,766,420 | 8/1988 | Hastings et al. | 340/550 |

Primary Examiner—Peter A. Nelson
Attorney, Agent, or Firm—John P. Tarlano

[57] ABSTRACT

The present invention relates to a method for protecting a space vehicle against directed energy, and to the resultant thermally protected space vehicle.

10 Claims, 1 Drawing Sheet

METHOD FOR PROTECTING A SPACE VEHICLE AND RESULTANT VEHICLE

BACKGROUND OF THE INVENTION

In U.S. Pat. No. 3,861,425 a flame retardant coating is used to coat fiber glass insulation. The coating of the '425 patent contains a flame retardant filler. The coating of the '425 patent also contains a fire retardant borate. The coating of the '425 patent is used to reduce flaming in an atmosphere that contains oxygen.

There is no teaching in the '425 patent of the use of a covering on a space vehicle to protect the space vehicle from the effects of directed energy in an oxygen free environment. Such directed energy may be in the form of optical radiation. The disclosed covering does not use a flame retardant filler, as used by the '425 patent.

SUMMARY OF THE INVENTION

The present invention relates to a method for protecting a manned or an unmanned space vehicle from the thermal loading effects of directed energy in space. The method comprises covering a portion of the space vehicle to be protected in space, with a moldable composition that contains a polymer, a phenolic resin and an intumescent material. The present invention also relates to a thermally protected manned or unmanned space vehicle.

An object of the present invention is to provide a method for protecting a space vehicle from thermal loads.

Another object of the present invention is to provide a thermally protected space vehicle.

DESCRIPTION OF THE PREFERRED EMBODIMENT

Figure 1:
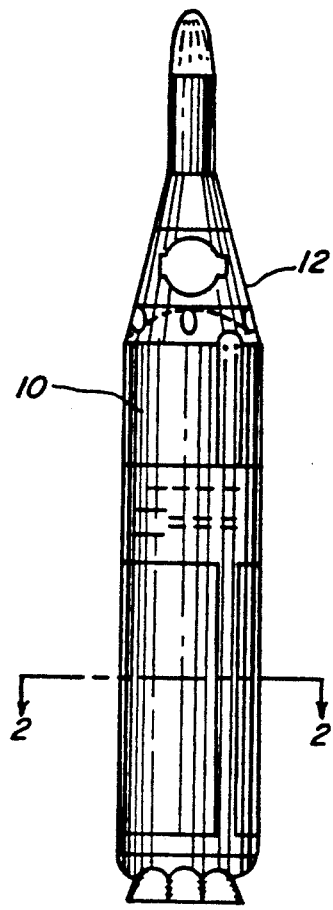
FIG. 1 is a view of a space vehicle that is covered with protective covering.
Figure 2:
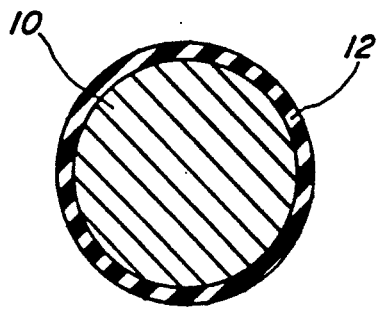
FIG. 2 is a sectional view of the space vehicle of FIG. 1.

A space vehicle 10, such as a missile, is shown in FIG. 1. The space vehicle 10 is covered with a thermally protective covering 12. The thermally protective covering 12 is made from a moldable composition having the following categories of ingredients:

(a) a polymer, or copolymer, of a 1,3-diene, preferable 1,3-butadiene, with a vinyl compound of which acrylonitrile is a preferred co-monomer;

(b) a phenolic resin, preferably one of the "varnish" resins, based on alkylated phenol, especially the methyl-substituted phenols such as ortho-, meta-, or para-creasol, or mixtures thereof; and (c) an intumescent material. Boron and compounds of boron, particularly the borates, are especially suitable. Examples of such material are boric acid and sodium bicarbonate. Boron hydrides such as decaborane, may also be used.

A suitable liquid composition might contain approximately equal parts of the three above listed categories of ingredients. For example, the suspension may contain 100 parts of the polymeric material, 120 parts of the phenolic resin and 80 parts of the intumescent material.

A curing agent may be added to the suspension. Examples of curing agents are thiuram disulfide, zinc oxide and stearic acid. The curing agent may be 1 to 5 parts of the above suspension.

The suspension may, if desired, first be cured in an appropriate mold and then attached to the space vehicle 10, with an adhesive. The shape of the thermally protective covering 12, or segment therof, may be retained by curing it at an elevated temperature, for example 280 to 320 degrees Fahrenheit. The final curing could be performed prior to application of the molded covering 12 on the structure to be protected.

The relative amount of the ingredients from the above cited categories may be varied to optimize other properties of the thermally protective covering 12. Such properties are elasticity, density, stiffness and hardness or abrasion resistance. An increase in the proportion of boric acid, for example, would increase the stiffness of the covering 12. However, such an increase would also enhance the thermal protection of the covering 12, against large thermal loads.

Adhesion, when the moldable composition is applied to a space vehicle 10, can be increased by increasing the proportion of the phenolic resin in the composition. The phenolic resin will cause adhesion of the moldable composition, as the moldable composition is being applied to space vehicle 10. The resin will also diminish the likelihood of an excessive increase in the hardness of covering 12. The covering 12 could then be cured on space vehicle 10, after the moldable composition is applied.

Hardness will also be increased by selecting a diene copolymer of a high acryloncrile content, such as 40 percent or more.

The compositions referred to above are amenable to a wide variety of percentage adjustments. The compositions are based on commercially available chemicals, and can be formed by methods well-known in the viscoelastic art. This versatility facilitates application of covering 12 on many diverse types of surfaces. The "radiation" resistance of such a surface, for example, of vehicle 10, will thus be improved.

The disclosed moldable composition may be applied to a space vehicle 10 in layers to form the covering 12. The covering 12 may be built up to have a thickness in the range of 25 mils to 1000 mils. A thin coating, such as below 25 mils, would only endure a very small radiation dosage. A thick covering, such as greater than 1000 mils would degrade the aerodynamics of the vehicle 10. The optimum thickness of a thermally protective covering 12 is strongly influenced by the mechanism by which the covering 12 dissipates absorbed energy. When the absorbed energy overcomes cohesive forces in the covering 12, significant portions of the covering 12 will be ejected from the space vehicle 10. The ejection will be produced by mechanisms such as spallation and ablation. Such a sacrificial removal of covering 12 from space vehicle 10 makes an added thickness of covering 12 desirable or even necessary.

Another method of applying the above described moldable composition involves spraying the composition through an orifice having an appropriate cross-section. Still another method is to mold the composition into a preform and adhesively bond the preform onto the surface of space vehicle 10.

When covering many similar bodies, such as many bodies of the same type as space vehicle 10, the use of molded pre-forms would be more feasible. Such pre-forms would have a smoother external surface, to help reduce aerodynamic drag on the vehicle 10, than would a spray applied covering 12. For a more limited number of bodies, similar to space vehicle 10, the use of spraying, "calendering," or the edge-joining of pre-cut segments to form covering 12, may be more economical. Calendering could involve use of a wringer having two or more smooth electric-heated teflon-coated rollers. More elaborate post-treatments of such latter coverings would probably be necessary in order to obtain a reasonably smooth surface.

A smoother surface can also be obtained by using a composition that has intumescent material, such as boric acid, of small particle sizes. For example the boric acid particles may be small enough to pass through 350 mesh screen.

While the present invention has been disclosed in connection with the preferred embodiment thereof, it should be understood that there may be other embodiments which fall within the spirit and scope of the invention as defined by the following claims.

What is claimed is:

1. A method for protecting a space vehicle from thermal loads due to directed energy comprising:
   (a) providing a moldable composition comprising a polymer, a phenolic resin and an intumescent material; and
   (b) covering a portion of the space vehicle with the moldable composition.

2. The method of claim 2 wherein the intumescent material is a compound of boron.

3. The method of claim 2 wherein the intumescent material is boric acid.

4. A method for protecting a space vehicle from thermal loads due to directed energy, comprising:
   (a) covering the space vehicle with a plurality of layers of a moldable composition comprising a polymer, a phenolic resin and an intumescent material.

5. The method of claim 4 wherein the polymer comprises 1,3-butadiene/acrylonitrile.

6. The method of claim 4 wherein the phenolic resin is an alkylated phenol.

7. The method of claim 4 wherein the intumescent material is boric acid.

8. A thermally protected space vehicle, comprising:
   (a) a space vehicle having an exterior surface; and
   (b) a molded thermally protective covering on a portion of the exterior surface of the space vehicle, the protective covering comprising a polymer, a phenolic resin and an intumescent material.

9. The thermally protected space vehicle of claim 8 wherein the protective covering has a thickness in the range of 25 mils to 1000 mils.

10. The thermally protected space vehicle of claim 8 wherein the protective covering is preformed prior to attachment to the portion of the exterior surface of the space vehicle.

* * * * *